United States Patent [19]
Wayand et al.

[11] Patent Number: 5,530,032
[45] Date of Patent: Jun. 25, 1996

[54] METHOD FOR THE PRODUCTION OF INTEGRAL SKIN FOAM

[75] Inventors: Hans-Jürgen Wayand, Idar-Oberstein; Günter Pöschl, Schwaikheim, both of Germany

[73] Assignee: PPV-Verwaltungs-AG, Zurich, Switzerland

[21] Appl. No.: 356,304

[22] PCT Filed: Jun. 25, 1993

[86] PCT No.: PCT/EP93/01633

§ 371 Date: Dec. 15, 1994

§ 102(e) Date: Dec. 15, 1994

[87] PCT Pub. No.: WO94/00288

PCT Pub. Date: Jan. 6, 1994

[30] Foreign Application Priority Data

Jun. 26, 1992 [DE] Germany .................. 42 20 998.6

[51] Int. Cl.⁶ ..................................... G08J 9/00
[52] U.S. Cl. ........................ 521/51; 521/130; 521/131; 521/133
[58] Field of Search .................. 521/51, 130, 131, 521/133

[56] References Cited

U.S. PATENT DOCUMENTS

| | | | |
|---|---|---|---|
| 5,034,424 | 7/1991 | Wenning et al. | 521/131 |
| 5,086,078 | 2/1992 | Harclerode et al. | 521/58 |
| 5,096,933 | 3/1992 | Volkert | 521/131 |
| 5,110,837 | 5/1992 | Harclerode et al. | 521/58 |

FOREIGN PATENT DOCUMENTS

| | | |
|---|---|---|
| 0398162 | 11/1990 | European Pat. Off. . |
| 1917962 | 2/1971 | Germany . |
| 32268181 | 1/1984 | Germany . |
| 4113578 | 10/1992 | Germany . |
| 1556158 | 11/1979 | United Kingdom . |

OTHER PUBLICATIONS

Derwent's Abstract No. 87–148657/21, Week 8721, Abstract of SU, A2, 1260235 (Petrol Gas Ind. Res.), Sep. 30, 1986.

A. M. Wittfoht, "Plastics Technical Dictionary", Part 3: Reference Volume, *Carl Hanser Verlag München Wien*, p. 147, (1978).

Jürgen Falbe and Manfred Regitz, "Rompp Chemie Lexikon", 9th Edition, pp. 4802–4803, (1992).

Derwent's Abstract No. 8218994E/10, Abstract of JP 8093901, (Tiejin KK), Feb. 2, 1982.

*Primary Examiner*—Morton Foelak
*Attorney, Agent, or Firm*—Panitch Schwarze Jacobs & Nadel

[57] ABSTRACT

A method for the production of integral skin foam is provided. An inert, non-flammable gas is added together with a low quantity of hydrocarbon fluid to a liquid skeleton substance. Only the inert, non-flammable gas serves during energy supply for foaming up the skeleton substance. The hydrocarbon fluid promotes the formation of a dense outer skin of the integral skin foam. The liquid skeleton substance is brought into a chamber and a sonochemical process is brought about in order to dissolve the gases in the liquid skeleton substance. The hydrocarbon fluid is less than 1% by volume of the inert gas and the liquid skeleton substance.

7 Claims, 1 Drawing Sheet

METHOD FOR THE PRODUCTION OF INTEGRAL SKIN FOAM

TECHNICAL FIELD

This invention relates to a method for the production of integral skin foam from a liquid skeleton substance which is foamed up by at least one inert, non-flammable gas which is set free by energy supply.

BACKGROUND ART

One such type of method is known from DE 32 26 818 A1. During this known method conventional devices are used for the measurement of gas and gas loading. After a measurement of density of a mixture sample which was taken from a machine container, or in a bypass the gas loading done at another position is controlled on the basis of this measurement. The addition of the gas occurs also in a bypass, for example, parallel to a return pipe-line coming from a mixer casing in the vicinity of a machine tank. The gas addition in the bypass is done by a capillary tube introduced into the pipe-line and a Venturi-tube. The control of gas loading can be done manually or with the help of a computer. The application of the Venturi-principle makes this known method difficult to control because the amount of gas loading is heavily dependent on an interface tension between liquid and gas, wherein high interface tension means small bubbles of the absorbed gas in the liquid and wherein low interface tension means large bubbles of the absorbed gas. In addition to that the known method working according to the Venturi-principle is high energy consuming because the flow in the pipe, in which the Venturi-device is situated, must have a high speed, so that the gas loading resulting according to the type of a water jet blast can function at all. Finally it is disadvantageous in the case of the known method, that relatively high quantities of foaming agent, among others hydrocarbon fluids, are necessary.

Another known method is, for example, mechanical frothing. In this case foaming agent, air and gelling agent are fed to a plastic serving as a skeleton substance and a homogeneous mixture is produced by a mixer (vide A.M. Wittfoth, Kunststofftechnisches Wörterbuch, Carl Hanser Verlag München Wien, Part 3, page 146, 1978). The mixture is then poured into a mould. In a subsequent heating operation the mixture expands and solidifies, so that a foamed product is produced. Therein a foaming agent in the form of azo or diazo-compounds is always added, which sets free $N_2$ or $CO_2$, when the foaming agent decomposes under gas formation in the heating operation subsequent to the mixing and thus leads to the foaming up of the skeleton substance and to the formation of foam. In the case of some foaming agents no heating process is necessary, as they decompose even at room temperature. However, even here normally a heating process is conducted afterward in order to cure the foam.

Again there are other methods for the production of foam from plastic, e.g. the one-shot process, which is also called direct process, or the two-step process. Therein either foaming agents or liquid solvents are admixed to a plastic to be foamed up. The foaming agents decompose at a certain temperature under gas formation and thus foam up the plastic by forming cavities within the plastic. In the case of production of foams by adding volatile solvents these are admixed to the plastic during the polymerisation, whereby spaces filled with solvent are created, which become cavities after the evaporation of the solvent.

Foams are produced from polystyrene, polycarbonates or polyurethanes, for example, wherein the production of foams from polyurethanes has the greatest technical importance and such foams find use in upholstery, mattresses or wrappings, for example.

Most of the known methods have the disadvantage, that during the use of foaming agents free from chlorofluorocarbons (CFC), like n-pentane, for example, with air there are easily produced very highly inflammable air-gas mixtures. These air-gas mixtures develop not only in the production phase of the foams, but also during aging of the foams afterward, during which the residual foaming agent is set free from the foam. Production companies for foams which handle such types of foaming agents, therefore require extremely high safety precautions. This is also valid for the later aging in rooms, in which the permitted concentration of gas density must be permanently checked and regulated by constant ventilation of the rooms. This requires not only expensive, matured technology within the production company, but leads also to a very high emission load of the atmosphere.

In the not pre-published DE 41 13 578 A1, which originates from this applicant, a device for the loading of viscous liquids with gases, in particular polyols for the production of polyurethane with preferably carbondioxide is described. If only carbondioxide is applied as gas for the foaming of the plastic during the production of foam, it can result to the formation of urea. This urea then leads to brittleness of the foam. Integral skin foam cannot be produced by this known device, where only $CO_2$ or any other similar gas is applied for foaming.

DISCLOSURE OF INVENTION

It is the object of the present invention to improve the type of gas loading of the liquid skeleton substance in a method according to the preamble of claim 1, i.e. to make it easier to control and less energy consuming, also regarding the application of hydrocarbon fluid.

This problem is solved according to the present invention by adding an inert, non-flammable gas together with a low quantity of hydrocarbon fluid to a liquid skeleton substance, whereby only the inert, non-flammable gas serves during energy supply for foaming up the skeleton substance and the hydrocarbon fluid promotes the formation of a dense outer skin of the integral skin foam. The liquid skeleton substance is brought into a chamber and a sonochemical process is brought about in order to dissolve the gases in the liquid skeleton substance. The hydrocarbon fluid, which consists of cyclobutane, cyclohexane, cyclopentane or a mixture thereof, is less than 1% by volume of the inert gas and the liquid skeleton substance.

In the method according to this invention the gas loading is not done following the Venturi-principle, thus not by a mechanical process, but by a sonochemical process. Under sonochemistry, also called ultrasonic chemistry, a part of chemistry is understood, which deals with the chemical effects of ultrasonics. Thereby it has been proved, that the main effects of the sonochemical reactions conductable only in the liquid phase go back to cavitation and the noticeable products correspond to these of the high temperature chemistry, as the high temperatures lead to molecule dissociation (sonolyse) in collapsing cavities, among others for the formation of free radicals (Römpp-Chemie-Lexikon, Georg Thieme Verlag, Stuttgart, Vol. 6, pages 4802 and 4803). In the case of the sonochemical process, which is utilized in the method according to this invention, vacuum bubbles contained in a liquid skeleton substance absorb gas. The gas then dispersed in the liquid skeleton substance is dissolved into the liquid by means of ultrasonics, and indeed even at low pressure, below the solubility pressure. The sonochemical process is energywise less expensive and makes the method according to this invention more simple to control than the method known from the DE 32 26 818 A1 indicated earlier. In addition the application of cyclobutane, cyclohexane, cyclopentane or a mixture thereof makes it possible to use less hydrocarbon fluid than in the state of the art technique according to the previously mentioned DE 32 26 818 A1.

From the DE-OS 19 17 962 it is actually known indeed, to use an acoustic pressure pump, wherein a medium to be admixed into a liquid, like air for example, is forced to pass through very fine nozzles, holes or sieve meshes. Thereby fine threads of air or gas flow produced in the liquid are divided or chopped into single, very tiny particles by the subsequent effect of the compression waves. Therein however the operation is a sonic operation, not an ultrasonic operation. Furthermore, air or gas bubbles mixed roughly into the liquid can be divided afterward into fine air or gas bubbles with the help of the principles described in the DE-OS 19 17 962. But thereby on the other hand only large air or gas bubbles swimming in the liquid are pumped through together with the liquid through nozzles, holes or sieve meshes by means of pressure impacts and are thus divided into similar bubbles. As the known acoustic pressure pump is active only in the sonic range, only a purely mechanical effect results on gas and liquid and not anything like the sonochemical effect as in the case of the method according to the present invention. In the case of the latter a liquid skeleton substance is brought into a chamber. The skeleton substance is foamed by at least an inert, non-flammable gas, which is inserted into the liquid skeleton substance together with hydrocarbon fluid. Thus in the chamber it is already a finished mixture, on which these ultrasonics will act in order to bring about the sonochemical process. Contrary to the same according to the DE-OS 19 17 962 it is always effected at first on liquid, air or gas separately, and subsequently fine meshed sieves, nozzles or holes are necessary for the mechanical diminution of air or gas bubbles.

By the application of hydrocarbon fluid combined with an inert, non-flammable gas under the action of sonochemical process according to this invention integral skin foam can be produced with optimum density distribution. In the case of the method according to this invention indeed combustible hydrocarbon is added to the integral skin foam, however, in such a low quantity (preferably below 1% by volume of the inert gas and the liquid skeleton substance), that no combustible evolution of gas can occur. Any embrittling is avoided and the environment is spared.

Advantageous formulations of this invention include a hydrocarbon fluid which is an azeotropic mixture of several hydrocarbons and an inert, non-flammable gas which is carbon dioxide, nitrogen, argon, helium or an azeotropic mixture thereof.

The method according to this invention is described herein with the help of the attached drawing.

BEST MODE OF CARRYING OUT THE INVENTION

Figure 1:
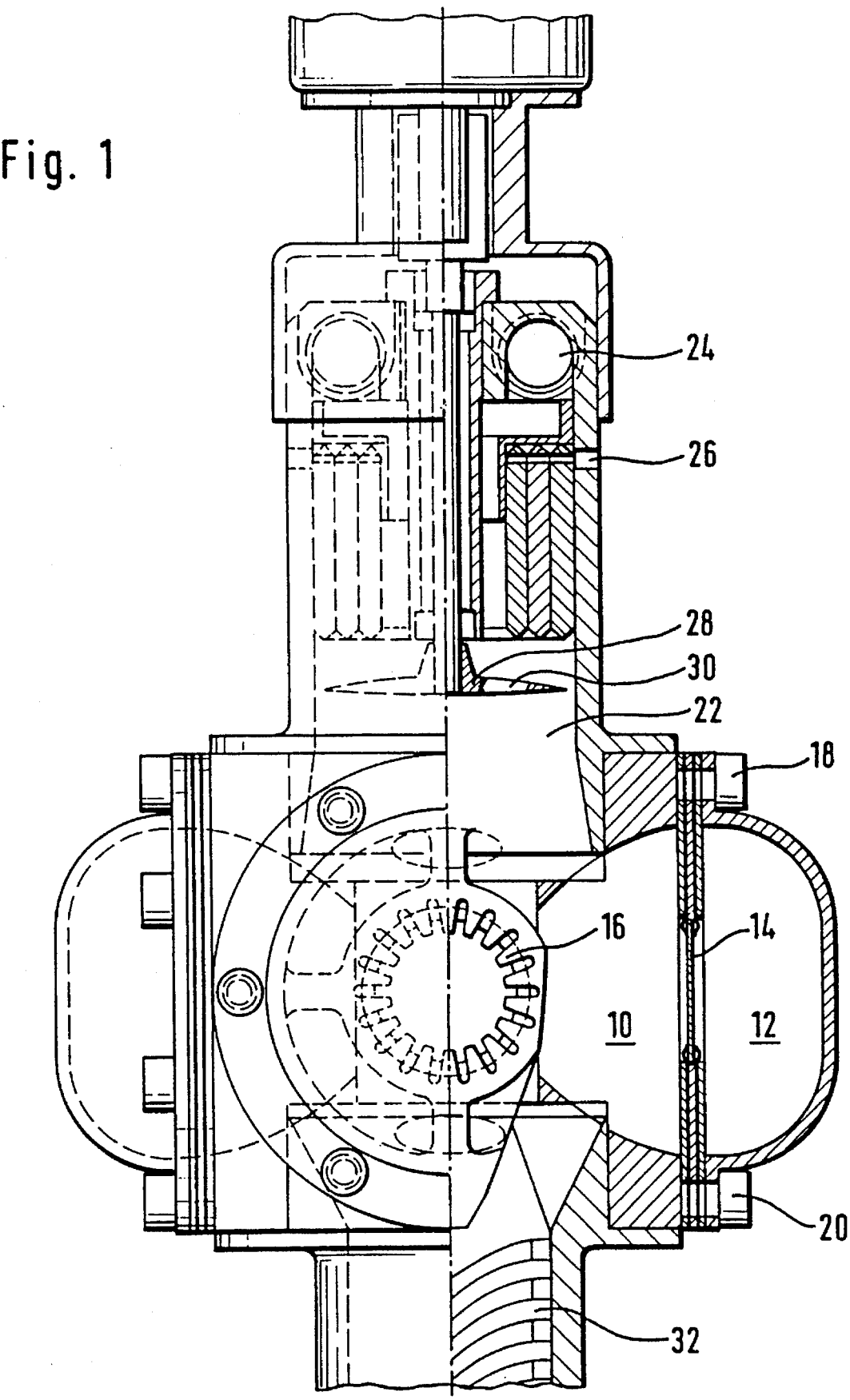
FIG. 1 shows a partly schematic cross-section of a device, in which the method according to this invention is carried out.

The shown device has a resonance chamber 10, which is composed of four chambers 12 placed opposite to each other in pairs and having the shape of cloverleaves. Each chamber has a concave, arcuate, bowl-shaped back side 12 and is open to the middle point of the resonance chamber 10. In each of the chambers 12 an ultrasonic oscillator 14 is arranged in such a way, that it can be freely flowed-around by a liquid skeleton substance to be treated. The liquid skeleton substance is in the present case polyol, for example. The ultrasonic oscillators 14 consist of membrane plates made of barium-lead-titanate as they are used for conventional water nebulizers. The ultrasonic oscillators 14 are in connection with a process computer controlled frequency generator through electrodes 18 and 20. Such frequency generator is used since the geometrical form of the ultrasonic oscillators 14 defines the oscillation frequency thereof, and since a change in frequency actually otherwise would be achieved only by the exchange of the ultrasonic oscillators 14.

The resonance chamber 10 has a certain size, which is defined by the wave length of the possible oscillation frequencies of the ultrasonic oscillators 14 and by the desired yield of integral skin foam.

The resonance chamber 10 is provided through a pre-chamber 22 with a fine mixture of the liquid skeleton substance, inert non-flammable gas and a hydrocarbon fluid, preferably an azeotropic mixture of several hydrocarbons. The pre-chamber 22 is supplied with the liquid skeleton substance by a supply pipe 24. The azeotropic mixture of hydrocarbons and the inert, non-flammable gas, in the present case carbondioxide, are supplied by another supply pipe 26. In addition to that it is also possible to provide one supply line for each of the components, i.e. the azeotropic mixture of hydrocarbons and the inert, non-flammable gas.

In the pre-chamber 22 the fed materials are converted into an extremely uniform mixture of the liquid skeleton substance, the azeotropic mixture of hydrocarbons and the inert, non-flammable gas by a fast rotating cavitation element 28. This mixing is improved still further by the ultrasonic oscillators 14, so that smallest bubbles of the inert, non-flammable gas as well as smallest components of the azeotropic mixture of hydrocarbons are distributed uniformly in the skeleton substance whereby the hydrocarbons and the inert, non-flammable gas are dissolved in the liquid skeleton substance.

By an outlet 32 this mixture is poured into a foam mould. In the case of energy supply preferably heating, for example, the inert, non-flammable gas dissolved in the liquid skeleton substance is set free again. This is comparable with dispersing of carbondioxide while opening a mineral water bottle. The inert, non-flammable gas set free foams up thus the liquid skeleton substance, by which the foam is produced. By the additionally added hydrocarbon the dense skin type surface usual for integral skin foam is achieved. Such an integral skin foam has a smooth, dense surface, as it is rated at automobile steering wheels or automobile dashboards.

During a subsequent curing process no combustible gas will be set free, so that an aging in specially checked and ventilated rooms is eliminated.

Tests have shown that the hydrocarbon fluid can consist of cyclobutane, cyclohexane or cyclopentane or of a mixture of these substances. Instead of carbondioxide also nitrogen, argon, helium or perhaps even an azeotropic mixture of the same can be used as inert, non-flammable gas in order to foam up the liquid skeleton substance. The skeleton substance itself can consist also of inorganic material instead of plastic. In addition to that it is also possible to convert hard foam, those for insulating of windows for example, into an integral skin foam with solid outer layer by the described method.

The values of the reaction temperatures and similar others are the same as those in the case of the production of foam.

We claim:

1. In a method for the production of integral skin foam from a liquid skeleton substance which is foamed up by at least one inert, non-flammable gas, which is set free by energy supply, the improvement comprising adding the inert, non-flammable gas together with a low quantity of hydrocarbon fluid to the liquid skeleton substance and whereby only the inert, non-flammable gas serves during the energy supply for the foaming up of the skeleton substance and the hydrocarbon fluid promotes the formation of a dense outer skin of the integral skin foam, the hydrocarbon fluid being selected from the group consisting of cyclobutane, cyclohexane, cyclopentane and mixtures thereof, introducing the liquid skeleton substance into a chamber and carrying out a sonochemical process in order to dissolve the gases in the liquid skeleton substance, the addition of hydrocarbon fluid being less than 1% by volume of the inert gas and the liquid skeleton substance.

2. The method according to claim 1, wherein the hydrocarbon fluid is an azeotropic mixture.

3. The method according to claim 1, wherein the inert, non-flammable gas is selected from the group consisting of carbon dioxide, nitrogen, argon, helium and an azeotropic mixture thereof.

4. The method according to claim 2, wherein the inert, non-flammable gas is selected from the group consisting of carbon dioxide, nitrogen, argon, helium and an azeotropic mixture thereof.

5. The method according to claim 1, wherein the liquid skeleton substance comprises a plastic material.

6. The method according to claim 5, wherein the plastic material is selected from the group consisting of polyurethane, polyol, polyamide, polypropylene glycol, polyvinyl chloride, polystyrene and polycarbonate.

7. The method according to claim 1, wherein the sonochemical process comprises applying ultrasonic oscillation to the liquid skeleton substance.

* * * * *